(No Model.)
F. BRAUN.
FRICTION COUPLING FOR SHAFTS.
No. 291,673. Patented Jan. 8, 1884.
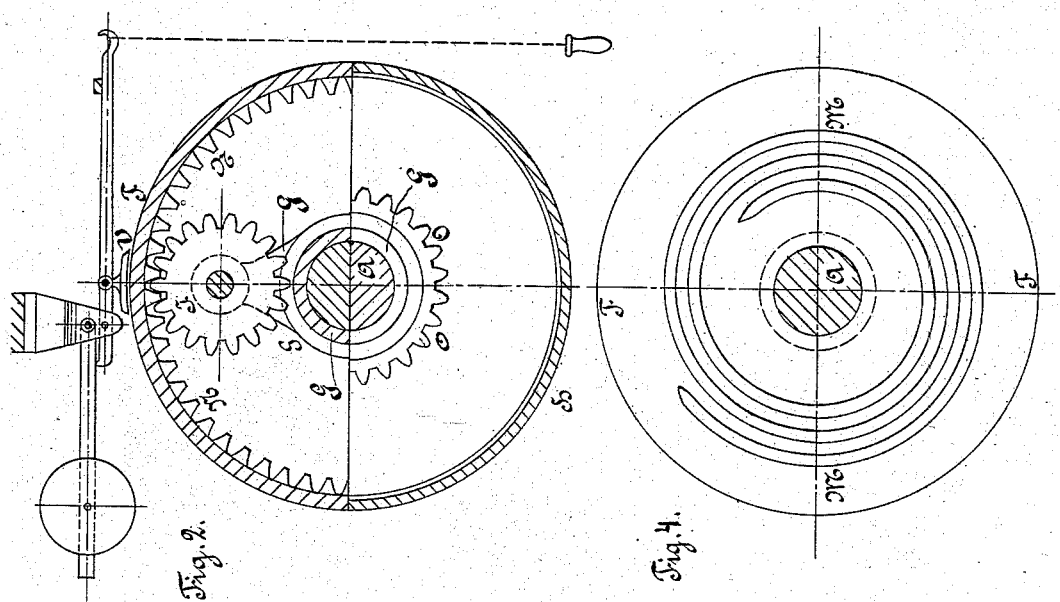
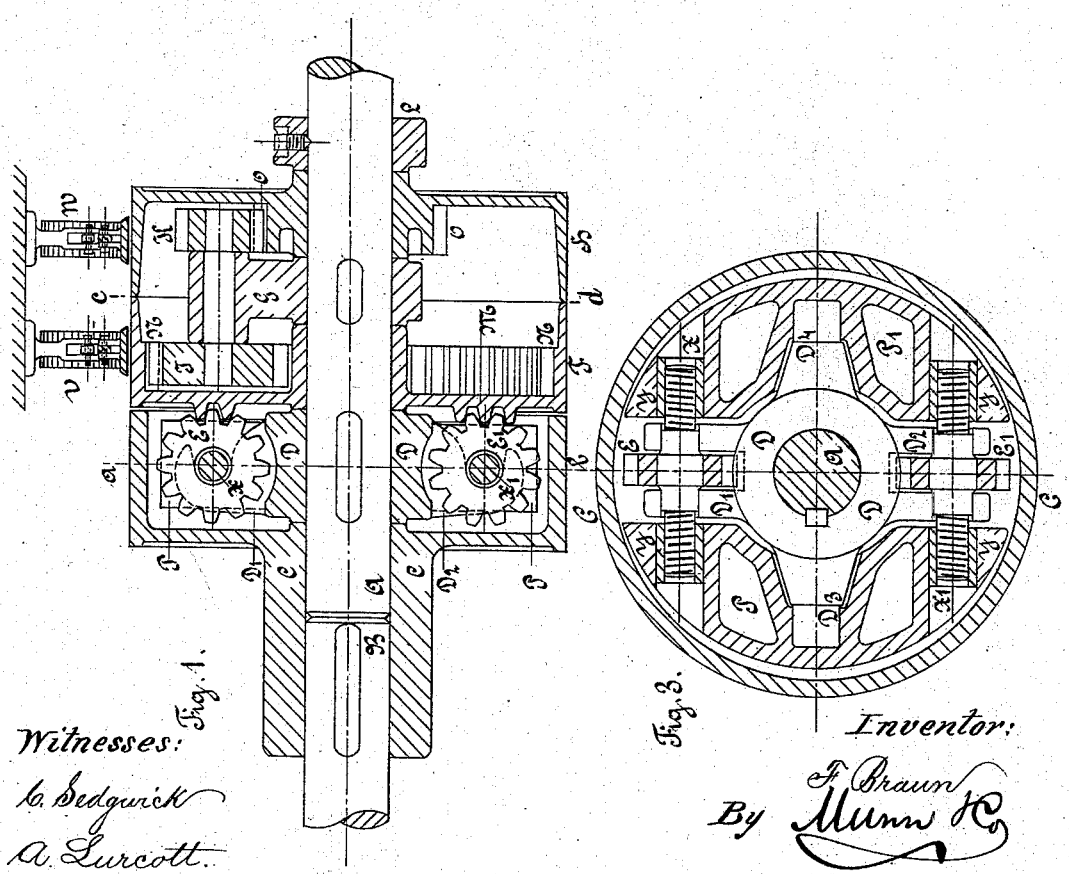
Witnesses:
C. Sedgwick
A. Lurcott
Inventor:
F. Braun
By Munn & Co.
Attorneys.

UNITED STATES PATENT OFFICE.

FRANZ BRAUN, OF BERLIN, GERMANY.

FRICTION-COUPLING FOR SHAFTS.

SPECIFICATION forming part of Letters Patent No. 291,673, dated January 8, 1884.

Application filed June 7, 1883. (No model.) Patented in Germany July 28, 1882, No. 19,936.

*To all whom it may concern:*

Be it known that I, FRANZ BRAUN, a subject of the King of Prussia, residing at Berlin, Prussia, Germany, have invented a new and useful Improvement in Universal Friction-Couplings for Shafts, Toothed Wheels, and Pulleys, (for which I have obtained patent in the German Empire, No. 19,936, bearing date July 28, 1882,) of which the following is a specification.

The object of my invention is to provide a new and improved shaft-coupling, by means of which the shafts can be coupled and uncoupled very easily and rapidly, and without causing any stoppage of the work or any lateral pressure on the bearings.

Reference is to be had to the accompanying drawings, forming a part of this specification, in which similar letters of reference indicate corresponding parts in all the figures.

Figure 1 is a longitudinal sectional elevation of my improved coupling. Fig. 2 is a cross-sectional elevation on the line $c\,d$, Fig. 1, each half being shown looking in opposite directions. Fig. 3 is a cross-sectional elevation on the line $a\,b$, Fig. 1. Fig. 4 is a face view of a disk provided with a spiral ridge.

On the driving-shaft A a carrier, D, is keyed or otherwise mounted, in the forked arms D' D² of which carrier or collar shafts X X of the cog-wheels E E are journaled, which shafts X X are provided at the opposite ends with right and left hand screw-threads. The arms D³ D⁴ of the carrier or collar D serve to guide the brake-blocks P P', which are provided with four screw-nuts, Y, corresponding with the screw-threaded ends of the shafts X X. The brake-blocks P P' are loosely mounted on the ends of the arms D³ D⁴. On the shaft A a disk, F, is loosely mounted, which is provided on its face with a spiral ridge, M. On the opposite surface the disk F is provided with an annular flange, N, which is provided with teeth on its inner surface, as is shown in the upper part of Fig. 2. An arm, G, is mounted on the shaft A, adjoining the hub of the disk F, which arm is provided in its free end with a shaft parallel with the shaft A, on one end of which shaft the cog-wheel J is mounted, and a smaller cog-wheel, K, is mounted on the opposite end. A flanged disk, H, also loosely mounted on the shaft A, is provided on its inner side with a toothed hub or boss, O, which engages with the teeth of the wheel K. Brakes $v$ and $w$, of some suitable construction, are secured to some convenient support, and are provided with devices for bringing them in and out of action when desired. A collar, L, held firmly on the shaft A, is to prevent lateral displacement of the coupling—that is, to prevent the coupling from moving longitudinally on the shafts. On the driven shaft B a coupling box or disk, C, is fastened, which is provided with a flange, so as to partly inclose or surround the carrier D and its arms. If the shaft B is to be coupled to the shaft A while the latter is revolving, the flanged disk H is arrested by means of the brake $w$. As the arm G is fastened to the shaft A, the flanged disk F will run in advance of the shaft A just as much as the disk H runs behind it, the ratio between the number of teeth on the wheel or boss O to that of its pinion K being the same as the ratio between the number of teeth on the flange N to that of its pinion J. As the collar D makes the same number of revolutions as the shaft A, the spiral ridge M, which runs faster than the shaft A, causes the cog-wheels E and E' to turn outward from the point of application of power—that is, from the tooth which is situated in the groove between two adjoining convolutions of the spiral M—whereby the two threaded ends of the shafts X X' are turned in their respective nuts Y, and the latter, together with the corresponding brake-blocks, P and P', are caused to move outward from the center until the brake-blocks come in contact with the inner surface of the flange of the disk C, and finally binding on the same, whereby the disk C and the shaft B, on which it is rigidly mounted, will be turned with the shaft A. Then the brake $w$ is released, and the shafts remain coupled until the flanged disk F is arrested by applying the brake $v$, whereby the teeth of the cog-wheels E E' pass between the spiral ridge M in the opposite direction and release the blocks P and P', and consequently destroy the connections between the shafts A and B.

The above-described coupling has neither disengaging-forks, shifting rails, nor any parts similarly exposed to wear and tear, and it can be operated with perfect safety.

Having thus fully described my invention, I claim as new and desire to secure by Letters Patent—

1. A shaft-coupling made substantially as herein shown and described, and consisting of a flanged disk or cap mounted on the driven shaft, a collar rigidly mounted on the driving-shaft, and carrying brake-blocks located within the cap or flanged disk on the driven shaft, and of disks mounted loosely on the driving-shaft, and engaging with cog-wheels mounted on the end of an arm on the driving-shaft, one of which disks is provided with a spiral ridge adapted to engage with cog-wheels mounted on screw-threaded shafts journaled in the ends of arms of the collar on the driving-shaft, substantially as herein shown and described, and for the purpose set forth.

2. In a shaft-coupling, the combination, with a cap or flanged disk mounted on the driven shaft, of a collar mounted on the driving-shaft, and provided with brake-shoes contained in the cap or flanged disk on the driven shaft, and of disks loosely mounted on the driving-shaft, and adapted to force the brake-shoes against the flange of the cap on the driven shaft or withdraw the brake-shoes from the said flange, substantially as herein shown and described, and for the purpose set forth.

3. The combination, with the driven shaft B and the driving-shaft A, of the flanged disk or cap C, mounted on the driven shaft B, the collar D, mounted on the shaft A, the right and left hand threaded shafts X X', mounted in arms of the collar D, the cog-wheels E E', mounted on the shafts X X', the brake-shoes P P', held loosely on arms of the collar D, the disk F, provided with a spiral ridge, M, and with a toothed flange, the disk H, provided with a toothed boss, the arm G, rigidly mounted on the shaft A, and the cog-wheels J K, journaled on the arm G, and engaging with the toothed flange of the disk F and the toothed boss of the disk H, respectively, substantially as herein shown and described, and for the purpose set forth.

4. The combination, with the driven shaft B and the driving-shaft A, of the flanged disk or cap C, mounted on the driven shaft B, the collar D, mounted on the shaft A, the right and left hand threaded shafts X X', mounted in arms of the collar D, cog-wheels E E', mounted on the shafts X X', the brake-shoes P P', held loosely on the arms of the collar D, the disk F, provided with a spiral ridge, M, and with a toothed flange, the disk H, provided with a toothed boss, the arm G, rigidly mounted on the shaft A, the cog-wheels J K, journaled on the arm G, and engaging with the toothed flange of the disk F and the toothed boss of the disk H, respectively, and of the brakes $v$ $w$, located above the flanges of the disks F H, respectively, substantially as herein shown and described, and for the purpose set forth.

In testimony whereof I have signed this specification in the presence of two subscribing witnesses.

FRANZ BRAUN.

Witnesses:
M. S. BREMER,
B. ROI.